(12) United States Patent
Saxler (10) Patent No.: US 9,018,619 B2
(45) Date of Patent: Apr. 28, 2015

(54) QUANTUM WELLS FOR LIGHT CONVERSION

(75) Inventor: Adam W. Saxler, Durham, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 11/545,131

(22) Filed: Oct. 9, 2006

(65) Prior Publication Data

US 2007/0045609 A1 Mar. 1, 2007

(51) Int. Cl.
*H01L 31/00* (2006.01)
*H04L 29/06* (2006.01)
*H04W 12/02* (2009.01)

(52) U.S. Cl.
CPC .......... *H04L 63/0272* (2013.01); *H04L 63/061* (2013.01); *H04L 63/08* (2013.01); *H04W 12/02* (2013.01)

(58) Field of Classification Search
CPC .. B82Y 20/00; H01L 33/06; H01L 21/02381; H01L 33/08; H01S 5/32341; H01S 5/2004; H01S 5/32366; H01S 5/34326; H01S 5/34333; G02F 1/017; G02F 1/01725; G02F 2001/0175
USPC .............. 257/899, 103, 79, E25.02, E33.008; 372/11, 50, 94, 45, 96, 24, 47
See application file for complete search history.

(56) References Cited

U.S. PATENT DOCUMENTS

| | | | |
|---|---|---|---|
| 4,946,547 A | 8/1990 | Palmour ........................ 156/643 |
| 4,992,302 A | 2/1991 | Lindmayer ..................... 427/70 |
| 5,200,022 A | 4/1993 | Kong ............................. 156/612 |
| RE34,861 E | 2/1995 | Davis ............................. 999/100 |
| 5,684,309 A * | 11/1997 | McIntosh et al. ............. 257/191 |
| 5,753,933 A * | 5/1998 | Morimoto ........................ 257/14 |
| 5,757,026 A | 5/1998 | Forrest et al. |
| 5,813,753 A | 9/1998 | Vriens et al. ................... 362/293 |
| 5,898,185 A | 4/1999 | Bojarczuk, Jr. et al. ....... 257/103 |
| 5,952,681 A | 9/1999 | Chen .............................. 257/89 |
| 5,959,316 A | 9/1999 | Lowery ........................... 257/98 |

(Continued)

FOREIGN PATENT DOCUMENTS

| | | |
|---|---|---|
| DE | 3315675 A | 11/1983 |
| DE | 9013615 U | 12/1990 |

(Continued)

OTHER PUBLICATIONS

Prentice Hall, *Laser Electronics* $2^{nd}$ Edition, J.T. Verdeyen, p. 363 1989.

(Continued)

*Primary Examiner* — Kenneth Parker
*Assistant Examiner* — Bo Fan
(74) *Attorney, Agent, or Firm* — Koppel, Patrick, Heybl & Philpott (57) ABSTRACT

A solid state light emitting device according to the present invention comprises an emitter structure having an active region of semiconductor material and a pair of oppositely doped layers of semiconductor material on opposite sides of said active region. The active region emits light at a first wavelength in response to an electrical bias across said doped layers. A quantum well structure is included that is integral to the emitter structure and has a plurality of layers having a composition and thickness such that the quantum well structure absorbs at least some of the light emitted from the active region and re-emits light of at least one different wavelength of light from said first wavelength.

28 Claims, 4 Drawing Sheets

(56) References Cited

U.S. PATENT DOCUMENTS

| | | | |
|---|---|---|---|
| 6,093,941 A | 7/2000 | Russell et al. | 257/103 |
| 6,166,489 A | 12/2000 | Thompson et al. | 313/506 |
| 6,212,213 B1 | 4/2001 | Weber et al. | 372/50 |
| 6,239,901 B1 | 5/2001 | Kaneko | 359/326 |
| 6,255,669 B1 | 7/2001 | Birkhahn et al. | 257/89 |
| 6,337,536 B1 | 1/2002 | Matsubara et al. | 313/498 |
| 6,667,185 B2 * | 12/2003 | Ishibashi et al. | 438/22 |
| 7,196,354 B1 | 3/2007 | Erchak et al. | 257/79 |
| 8,759,850 B2 | 6/2014 | Coe-Sullivan et al. | 257/89 |
| 2002/0003233 A1 | 1/2002 | Mueller-Mach et al. | 257/84 |
| 2003/0205714 A1 * | 11/2003 | Sugawara et al. | 257/89 |
| 2004/0036130 A1 | 2/2004 | Lee et al. | 257/409 |
| 2004/0129944 A1 * | 7/2004 | Chen | 257/89 |
| 2004/0245912 A1 * | 12/2004 | Thurk et al. | 313/484 |
| 2005/0017260 A1 | 1/2005 | Lee | 257/101 |
| 2008/0149166 A1 | 6/2008 | Beeson et al. | 136/248 |
| 2009/0272996 A1 | 11/2009 | Chakraborty | 257/98 |
| 2010/0283036 A1 | 11/2010 | Coe-Sullivan et al. | 257/13 |
| 2011/0186811 A1 | 8/2011 | Coe-Sullivan et al. | 257/13 |
| 2011/0303940 A1 | 12/2011 | Lee et al. | 257/98 |
| 2011/0305002 A1 | 12/2011 | Lim et al. | 362/84 |
| 2012/0286238 A1 | 11/2012 | Linton et al. | 257/13 |
| 2013/0009131 A1 | 1/2013 | Kazlas et al. | 257/13 |
| 2013/0016499 A1 | 1/2013 | Yee et al. | 362/97 |
| 2013/0099264 A1 | 4/2013 | Zimmerman et al. | 257/89 |
| 2013/0193407 A1 | 8/2013 | Clough et al. | 257/13 |
| 2013/0200334 A1 | 8/2013 | Zhang et al. | 257/13 |
| 2013/0234109 A1 | 9/2013 | Breen et al. | 257/13 |
| 2013/0277643 A1 | 10/2013 | Williamson et al. | 257/13 |
| 2013/0326941 A1 | 12/2013 | Pickett et al. | 47/1.4 |
| 2014/0021440 A1 | 1/2014 | Mahan et al. | 257/13 |

FOREIGN PATENT DOCUMENTS

| | | |
|---|---|---|
| DE | 19645035 C1 | 4/1998 |
| EP | 1142034 | 10/2001 |
| JP | 05152609 A | 6/1993 |
| JP | 08007614 A | 1/1996 |
| JP | 10056203 | 2/1998 |
| WO | WO 9750132 | 12/1997 |
| WO | WO 9812757 | 3/1998 |

OTHER PUBLICATIONS

Nichia Corp. White LED, Part Nos. NSPW300BS, NSPW312BS, pp. 1-3. (1999).

JPN. J. Appl Phys. vol. 42 (2003) pp. 4197-4202, Part 1 No. 7A, Jul. 2003, Control of Emission Wavelength of GAINN Single Quantum Well, Light Emitting Diodes Grown by Metalorganic Chemical Vapor Deposition in a Split-Flow Reactor, Yamashita et al.

Journal of Applied Physics 35(Mar. 2002) pp. 604-608 "Light Emission Ranging From Blue to Red From a Series of InGaN/GaN Single Quantum Wells"., Martin et al.

JPN. J. Appl. Physics. vol. 38 (Apr. 1999), pp. 3976-3981, "Characteristics of InGaN-BasedUV/Blue/Green/Amber/Red Light-Emitting Diodes".

European Office Action for counterpart application No. 03 075 791.8, Feb. 19, 2010.

Powell, Physics of Solid-State Laser Materials, 1998, Springer-Verlag New York, Inc., pp. 215-253.

Patents Abstracts of Japan, 05152609 A, Jun. 18, 1993, Yoshiaki.

Patents Abstracts of Japan, 08007614 A, Jan. 12, 1996, Yoshinori.

Office Action from U.S. Appl. No. 11/484,233, dated: Oct. 18, 2010.

Office Action from U.S. Appl. No. 11/484,233, dated: Apr. 13, 2010.

Examination Report from European Patent Appl. No. 03075791.8, dated Feb. 27, 2013.

Office Action from U.S. Appl. No. 13/837,442, dated Aug. 27, 2014.

Ohno, "Spectral design consideration for white LED color rendering," Optical Engineering 44(11), 111302 (Nov. 2005). pp. (111302-)1-9.

Demir, et al, "Photometric design of color-conversion LEDs", SPIE Newsroom 10.117/2.1201102.003507 1-3 copyright 2011 SPIE.

* cited by examiner

QUANTUM WELLS FOR LIGHT CONVERSION

BACKGROUND OF THE INVENTION

1. Field of the Invention

This invention relates to solid state light emitting diodes (LEDs) and lasers that can emit various colors of light, including white.

2. Description of the Related Art

Light emitting diodes (LEDs) are a known class of solid state devices that convert electric energy to light. They generally comprise one or more active layers of semiconductor material sandwiched between oppositely doped layers. When a bias is applied across the doped layers, holes and electrons are injected into the active layer where they recombine to generate light. Light is emitted omnidirectionally from the active layer and from all surfaces of the LED. The useful light is generally emitted in the direction of the LED's top surface, which is usually p-type.

One disadvantage of conventional LEDs is that they cannot generate white light from their active layers. One way to produce white light from conventional LEDs is to combine different colors from different LEDs. For example, the light from red, green and blue LEDs, or blue and yellow LEDs can be combined to produce white and other colors of light. One disadvantage of this approach is that it requires the use of multiple LEDs to produce a single color of light, increasing costs. In addition, different colors of light are often generated from different types of LEDs which can require complex fabrication to combine in one device. The resulting devices can also require complicated control electronics since the different diode types can require different control voltages. Long term wavelength and stability of these devices is also degraded by the different aging behavior of the different LEDs. In applications such as displays or television screens, this can also result in a prohibitive number of LEDs and can require complex control electronics.

Light from a blue emitting LED can be converted to white light by surrounding the LED with a yellow phosphor, polymer or dye. [See Nichia Corp. white LED, Part No. NSPW300BS, NSPW312BS, etc., which comprise blue LEDs surrounded by a yellow phosphor powder; see also U.S. Pat. No. 5,959,316 to Hayden, entitled Multiple Encapsulation of Phosphor-LED Devices.] The surrounding material "downconverts" the wavelength of some of the LED light, changing its color. For example, if a nitride based blue emitting LED is surrounded by a yellow phosphor, some of the blue light passes through the phosphor without being changed while the remaining light is downconverted to yellow. The LED emits both blue and yellow light, which combine to produce white light.

The addition of the phosphor can result in a complex LED that requires a complex manufacturing process. In addition, the net light emitting efficiency is reduced due to the absorption in the phosphor and the Stokes shift from blue to yellow. Other examples of LEDs using this approach include U.S. Pat. No. 5,813,753 to Vriens et al., and U.S. Pat. No. 5,959,316 to Lowery.

Recent advances in nitride based LEDs have resulted in highly efficient light sources such as blue, and their efficiency is expected to surpass filament (and flourescent) based light sources. However, conventional blue LEDs operate from a relatively low supply of current that results in a light that can be too dim for many lighting applications. This problem is compounded by the absorption of some of the blue light by the downconverting material used in generating white light from a blue source. For blue LEDs to provide a bright enough light source for room illumination, the current applied to the LED must be increased from the conventional 20-60 mAmps to 0.8-1 Amp. At this current, LEDs become very hot and any material surrounding the LED will also become hot. The heat can damage the downconverting material surrounding the LED, degrading its ability to downconvert the LED's light. The heat can also present a danger of burning objects that are near or in contact with the LED.

Solid state lasers convert electrical energy to light in similar fashion compared to LEDs. [Prentice Hall, *Laser Electronics* $2^{nd}$ *Edition*, J. T. Verdeyen, Page 363 (1989)]. They are structurally similar to LEDs but have mirrors on two opposing surfaces. In the case of edge emitting lasers the mirrors are on the device's side surfaces and reflect light generated by the active layer allowing a small fraction to escape from the side of the laser, through one of the mirrors. This results in a highly collimated/coherent light source. A vertical cavity laser works much the same as an edge emitting laser, but the mirrors are on the top and the bottom. Light from the active layer reflects between the mirrors, providing a similar collimated light source from the laser's top surface.

SUMMARY OF THE INVENTION

One embodiment of a solid state light emitting device according to the present invention comprises an emitter structure having an active region of semiconductor material and a pair of oppositely doped layers of semiconductor material on opposite sides of said active region. The active region emits light at a predetermined wavelength in response to an electrical bias across said doped layers. A quantum well structure is included that is integral to the emitter structure and has a plurality of layers having a composition and thickness such that the quantum well structure absorbs at least some of the light emitted from the active region and re-emits light of at least one different wavelength of light.

One method for generating light from a solid state light emitting device according to the present invention comprises exciting optical emission from an active region within a first wavelength range. A quantum well structure is illuminated with at least a portion of the optical emission. The quantum well structure absorbs light from the optical emission within the first wavelength range and provides re-emission within a different wavelength range. A wavelength combination of both emissions is then transmitted.

These and other further features and advantages of the invention will be apparent to those skilled in the art from the following detailed description, taken together with the accompanying drawings.

DETAILED DESCRIPTION OF THE INVENTION

The present invention is directed to solid state emitters (and methods for light emission) utilizing quantum well structures to absorb light from the active region of the emitters, and re-emit light at a wavelength different from the active region wavelength of light. In one embodiment, the solid state emitter can emit a wavelength combination of light from the active region and the quantum well structures. In other embodiments, the solid state emitter and quantum well structures can be arranged so that the light emitted from the emitter is primarily re-emitted light from the quantum well structure.

The quantum well structures can be located in many different places integral to the emitters, such as on or within the solid state emitters, with one embodiment having a quantum well structure on an outside surface of the emitter. This allows for the quantum well structure to be formed on the emitter following fabrication (and annealing where necessary) of the emitter layers, which in turn allows for the quantum well layers to have a greater number of materials and compositions that might otherwise be damaged or degraded by some fabrication (and annealing) processes. In other embodiments, the quantum well structure can be remote to the emitter.

Many different quantum well structures can be used according to the present invention, such as single quantum well (SQW) structures or multiple quantum well (MQW) structures having different thicknesses and compositions. In some embodiments of the present invention, the emitters are LEDs having active region emission in a particular wavelength spectrum. The active layer emission is converted by the quantum well structure without the use of external phosphors. This eliminates a process step of adding phosphors to the LED, which can result in reduced fabrication costs. The thickness and composition of the quantum well structure can also be controlled to allow for better control of the light emitted from quantum well structure, and as a result the LED.

The present invention is described herein with reference to certain embodiments but it is understood that the invention can be embodied in many different forms and should not be construed as limited to the embodiments set forth herein. It is also understood that when an element such as a layer, region or substrate is referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one layer or another region. It is understood that these terms are intended to encompass different orientations of the device in addition to the orientation depicted in the figures.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-sectional view illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing. A region illustrated or described as square or rectangular will typically have rounded or curved features due to normal manufacturing tolerances. Thus, the regions illustrated in the figures are schematic in nature and their shapes are not intended to illustrate the precise shape of a region of a device and are not intended to limit the scope of the invention.

Figures 1, 4:
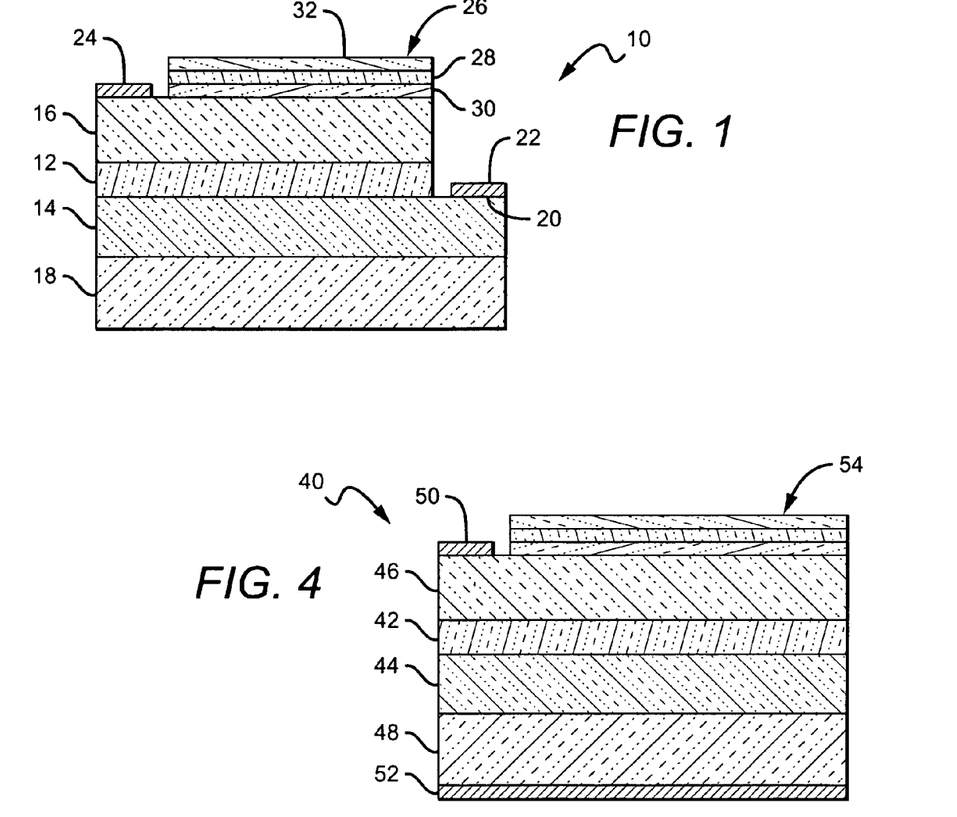
FIG. 1 is a sectional view of one embodiment of an LED according to the present invention having a single quantum well structure.
FIG. 4 is a sectional view of another embodiment of an LED according to the present invention having a single quantum well structure.

Referring now to the drawings and in particular FIG. 1, one embodiment of a solid state emitter 10 according to the present invention is shown that comprises a light emitting diode (LED), although it is understood that different solid state emitters can also be used. The fabrication and operation of LEDs is known in the art and only briefly discussed herein. The layers of the LED 10 can be fabricated using known processes with a suitable process being fabrication using metal organic chemical vapor deposition (MOCVD). The layers of the LED 10 generally comprise an active layer/region 12 sandwiched between first and second epitaxial layers 14, 16, all of which are formed successively on a substrate 18. It is understood that additional layers and elements can also be included in the LED 10, including but not limited to buffer, nucleation, contact and current spreading layers as well as light extraction layers and elements. The active region 12 can comprise SQW, MQW, double heterostructure or super lattice structures. In one embodiment, the first epitaxial layer 14 is an n-type doped layer and the second epitaxial layer 16 is a p-type doped layer, although in other embodiments the first layer 14 can be p-type doped and the second layer 16 n-type doped. The first layer 14 and second layer 16 are hereinafter referred to as n-type and p-type layers, respectively.

The layers 12, 14, 16 of the LED 10 may be fabricated from different material systems, with preferred material systems being Group-III nitride based material systems. Group-III nitrides refer to those semiconductor compounds formed between nitrogen and the elements in the Group III of the periodic table, usually aluminum (Al), gallium (Ga), and indium (In). The term also refers to ternary and quaternary compounds such as aluminum gallium nitride (AlGaN) and aluminum indium gallium nitride (AlInGaN). In a preferred embodiment, the p-type material and the n-type material is gallium nitride (GaN) and the active material is InGaN. In alternative embodiments the p-type and n-type materials may be AlGaN, aluminum gallium arsenide (AlGaAs) or aluminum gallium indium arsenide phosphide (AlGaInAsP).

The substrate 18 can be made of many materials such as sapphire, silicon carbide, aluminum nitride (AlN), GaN, with a suitable substrate being a 4H polytype of silicon carbide, although other silicon carbide polytypes can also be used including 3C, 6H and 15R polytypes. Silicon carbide has a much closer crystal lattice match to Group III nitrides than sapphire and results in Group III nitride films of higher quality. Silicon carbide also has a very high thermal conductivity so that the total output power of Group III nitride devices on silicon carbide is not limited by the thermal dissipation of the substrate (as may be the case with some devices formed on sapphire). SiC substrates are available from Cree Research, Inc., of Durham, N.C. and methods for producing them are set forth in the scientific literature as well as in a U.S. Pat. No. Re. 34,861; 4,946,547; and 5,200,022. It is understood that the LED 10 can be provided without a substrate 18. The LED 10 can be formed without a substrate or the substrate 18 can be removed after formation of the LED layers 12, 14, 16.

The LED 10 is shown having a geometry referred to in the art "lateral geometry", although the invention is equally applicable to vertical geometry devices as described below. In lateral geometry devices, and upper surface 20 of the n-type layer 14 is exposed, such as by etching the p-type and active layers 12, 14 above it. An n-type contact 22 is included on the upper surface 20 in ohmic contact with the n-type layer 14, and a p-type contact 24 is included on and in ohmic contact with the p-type layer 16. The n- and p-type contacts 22, 24 can be made of many different conductive materials known in the art and can be deposited using known methods, such as sputtering. When an electrical signal is applied across the n- and p-type contact 22, 24 the active layer 12 of the LED 10 emits light.

The LED 10 further comprises a quantum well structure 26 that, as mentioned above, can be located in different places within the LED 10 or can be on a surface of the LED 10. The quantum well structure should be located to allow at least some light from the LED's active region 12 to pass into the quantum well structure 26. In the embodiment shown the quantum well structure is formed on the p-type layer 16, but it can also be on other surfaces.

As described above, the quantum well structure 26 can comprise different numbers of layers with different compositions and thicknesses. The structure 26 is shown as a SQW structure comprising a well layer 28 sandwiched between first and second barrier layers 30, 32 that can be doped n- or p-type. In one embodiment the well layer 28, and first and second barrier layers 30, 32 are all doped n-type. The well layer 28 can comprise a material having smaller bandgap than the barriers layer 30, 32, and a smaller bandgap than the LED's active region 12. The quantum well layers are preferably made of materials from the Group-III nitride material system, although other materials can also be used. In one embodiment, the first and second barrier layers 30, 32 comprise InGaN or GaN, and the well layer comprises InGaN. In other embodiments the well layer 28, first barrier layer 30 and second barrier layer 32 can comprise different combination of In, Al, Ga and N. In still other embodiments, small amounts of boron (B), phosphorous (P) and arsenic (As) can be added to form InAlGaBNPAS alloys. First and second barrier layers 30, 32 can also be undoped or doped with shallow n-type dopants such as silicon (Si), germanium (Ge), or oxygen (O) to improve the luminescent properties without appreciably affecting the emission wavelength.

The quantum well structure 26 is arranged so that light from the LED's active layer 12 passes into one or both of the first and second barrier layers 30, 32. One or both of the first and second barrier layers 30, 32 absorbs the active layer light and generates electrons and holes that then pass into the well layer 28. The electrons and holes can then be confined in the well layer 28 where they combine to generate light having a wavelength different from the LED's active region light. This light is then re-emitted from the quantum well structure and emitted from the LED 10. One factor that determines the wavelength at which light is re-emitted from the quantum well structure 26 is the composition of the well layer 28. For most well layers made of InGaN, the greater the percentage of In, the longer the wavelength of re-emitted light. The degree of In segregation within the well can also influence the wavelength of re-emitted light since the local In composition may be higher than average. For example, the In within an InGaN layer may not have uniform composition. A nominally 10% In layer may have regions of 5% In and 15% In. As a result, the characteristic emission wavelength may correspond more to a 15% In composition than a 10% composition.

The thickness of the well layer 28 can also be important, and the wavelength of re-emitted light can decrease as the thickness of the well layer 28 decreases. As is known in the art, the energy levels are pushed away from the bottom of the quantum wells as the thickness of the well layer decreases. This in turn can cause the wavelength of the re-emitted light to decrease. The polarization, doping, and excitation intensity can also impact the wavelength of re-emitted light.

For the quantum well structure 26 to efficiently re-emit light in desired wavelength spectrums, the In content of the well layer 28 can be approximately 60%, although many different In concentrations can be used. The thickness of the well layer can also be in the range of approximately 0.3 to 10 nanometers (nm), although other thicknesses can also be used. A preferred range of thicknesses can be approximately 1 to 5 nm. The thickness of the first and second barrier layers can be in the range of approximately 0.5 to 1000 nm. It is understood, however, that these layers can have thicknesses outside these approximate ranges. One embodiment of a SQW that can be used comprises a 50 nm $Al_{0.1}Ga_{0.9}N$:Si n-doped first barrier layer, 3 nm $In_xGa_{1-x}N$:un well layer, and 250 nm GaN:Mg p-doped second barrier layer. The different values of x for the well layer, in addition to other factors, influence the wavelength of light re-emitted from the quantum well structure. It is also understood that the layers can have many different doping arrangements such as the well layer and first and second barrier layers being all n-type doped, all p-type doped or any combination of layer dopants. In another embodiment of the LED 10, The barrier layers 30, 32 can also be compositionally graded to improve movement of the electrons and holes into the well layer 28. This can also reduce non-radiative recombination of the electrons and holes.

Figure 2:
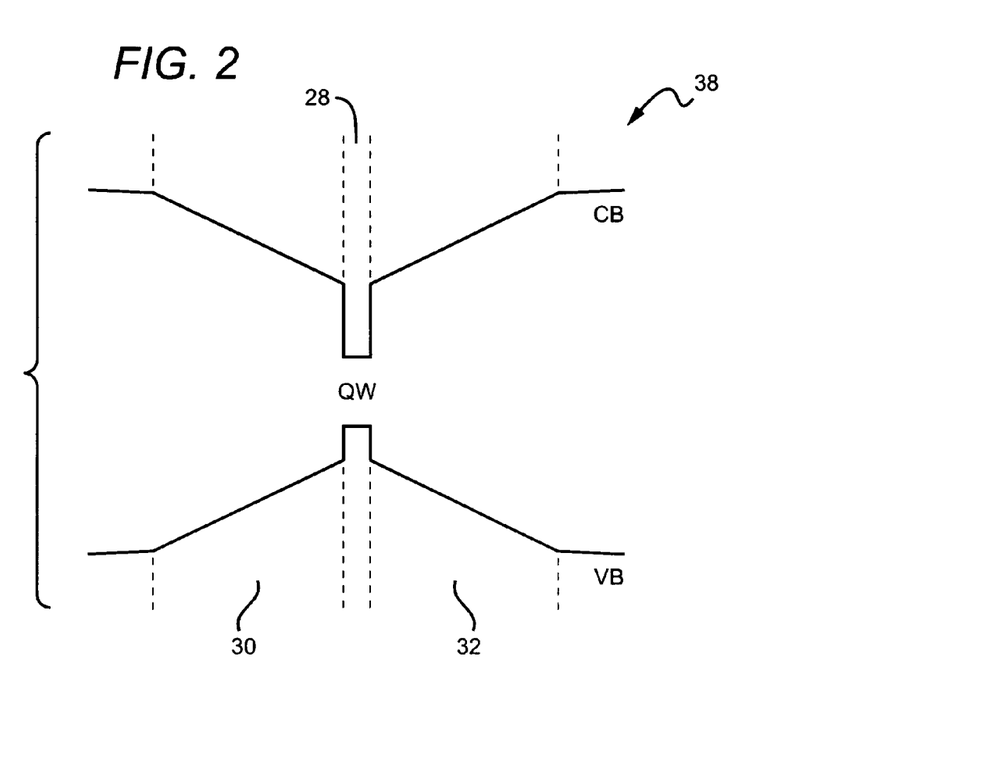
FIG. 2 is a band diagram for a single quantum well structure according to the present invention having graded barrier layers.
Figure 3:
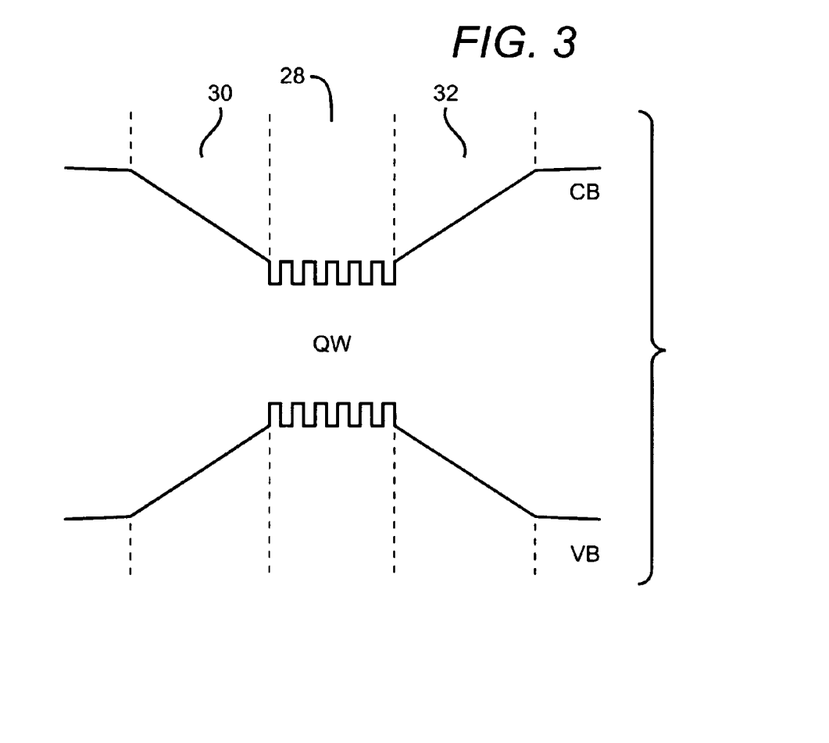
FIG. 3 is a band diagram of a single quantum well structure according to the present invention having a super lattice well layer and graded barrier layers.

FIG. 2 shows a band diagram 38 for one embodiment of a single quantum well structure according to the present invention. It is understood that the diagram is simplified and ignores certain factors such as the piezoelectric influence of the quantum well materials. The diagram illustrate the conduction band (CB) and valence band (VB) for the quantum well structure. The well layer 28 shown as a quantum well (QW), and in this embodiment the well layer has a high In percentage. The barrier layers 30, 32 have an In content that decreases moving away from the well layer 28. This results in the sloping of the CB and VB through the barrier layers 30, 32. This sloping improves movement of electrons and holes through the barrier layers 30, 32 to the well layer 28. FIG. 3 shows a similar band diagram with a super lattice well layer 28. The well layer 28 and barrier layer 30, 32 have similar In percentages to improve electron and hole movement to the well layer 28.

The quantum well structure 26 can be deposited using different methods and at different times in the LED fabrication process. In a preferred embodiment the structure 26 is deposited on the LED 10 following growth of the n-type layer 14, active region 12, and p-type layer 16, as well as after any annealing of these layers. These layers are allowed to cool and the structure 26 can be deposited using known methods such as MOCVD.

The growth and annealing processes typically occur at relatively high temperature. By waiting until after cool down the quantum well structure 26 is not subjected to these higher temperatures during or after its growth. It can be deposited at much lower temperatures and as a result can contain materials that would otherwise be damaged or degraded by higher temperatures. This allows for the use of increased percentages of materials such as In that can be susceptible to high temperature degradation/damage. This in turn allows for the structure 26 to have a high enough percentage of In to allow it to re-emit red light (which is typically difficult from a Group-III nitride emitter). To avoid degradation and/or damage to the In within the quantum well structure it is preferable not to heat the quantum well structure to typical growth temperatures during subsequent processing steps. It is understood that the structure 26 can be made from other semiconductor material systems including but not limited to ZnMGCdO.

In operation, an electrical signal is applied across the n- and p-type contacts causing the active layer 12 to emit light. In one embodiment the active region emits in the blue wavelength spectrum, although it could be arranged to emit in other wavelength spectrums such as ultra violet (UV). Light from the active region emits from all surfaces of the LED 10, with a portion of the light passing into the quantum well structure 26 where it is absorbed and re-emitted at a different (typically longer) wavelength. The LED emits a wavelength combination of light from the active layer and quantum well structure. In one embodiment the quantum well structure 26 can re-emit yellow light with the LED 10 emitting a white light combination of active region blue and quantum well structure yellow.

FIG. 4 shows another embodiment of an LED 40 according to the present invention having a vertical geometry. It comprises an active region 42 sandwiched between n-type 44 and p-type 46 layers, all of which can be formed successively on a substrate 48. These elements are similar to the corresponding features described above and shown in FIG. 1 and are only briefly discussed herein. A p-type contact 50 is on the p-type layer and an n-type contact 52 is on the substrate 48. The substrate 48 preferably comprises a conductive material that allows current to spread from the n-type contact 52 to the n-type layer 44, through the substrate. In other embodiments, the LED 40 can be provided without a substrate and the n-type contact 52 can be on the n-type layer 44.

A quantum well structure 54 similar to the structure 26 described above can be included on the outside surface of the LED 40, and as shown is on the p-type layer 50. The structure 54 is also arranged to absorb light from the active layer 42 and re-emit light at a different wavelength of light. The LED 40 operates in a similar way to LED 10.

Figure 5:
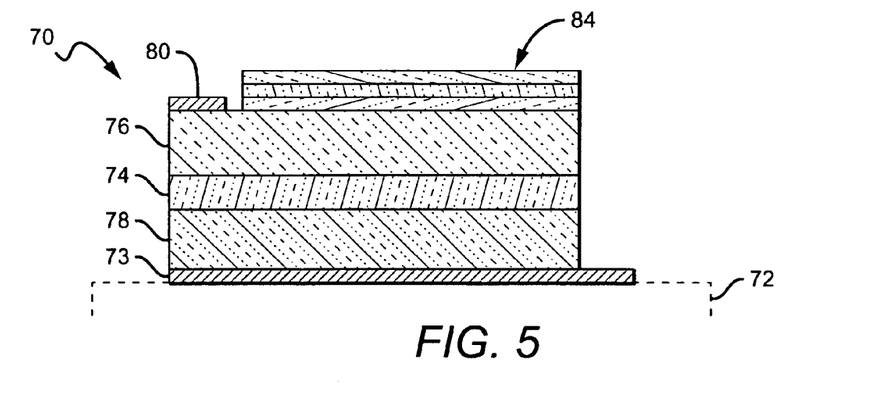
FIG. 5 is a sectional view of still another embodiment of an LED according to the present invention having a single quantum well structure.

The quantum well structure can also be included on flip-chip type LED arrangement, and FIG. 5 shows one embodiment of an LED 70 that is flip-chip mounted to a structure 72 such as a submount, heat sink or printed circuit board. The LED comprises an active region 74, sandwiched between a n-type layer 76 and p-type layer 78, but in this embodiment the p-type layer 78 is below the active region and the n-type layer 76 is above the active region 74. The LED 70 can also comprise a substrate (not shown) on the n-type layer 76 although in other embodiments, the LED can be provided without a substrate. An n-type contact 80 can be included on the n-type layer 76 and the p-type layer can be contacted through the structure 72 or through conductive path 73. A wire bond (not shown) can be coupled to the n-type contact 80 and a bias can be applied to the LED 70 across the conductive path 73 and wire bond to cause the active region to emit light.

The quantum well structure 84 is included on the n-type layer 76 and can be fabricated under lower temperature conditions, after fabrication of the LED active layers. In those embodiments with a substrate, the quantum well structure 84 can be included on the surface of the substrate and can be fabricated using the methods described above. In embodiments having high In content quantum well structures, the quantum well structure may not be fabricated with the LED active layers because of damage or degradation that can occur at high temperature. In these embodiments, the quantum well structure can be formed on the LED active layers after flip chip mounting, such as after wafer bonding/mounting or at the chip level. The quantum well layer can then be deposited using different processes at room temperature, or above room temperature but below typical growth temperatures for the LED active layers. These can include low temperature MOCVD or sputtering. It is understood that these same processed can be used in other embodiments described herein.

Figure 6:
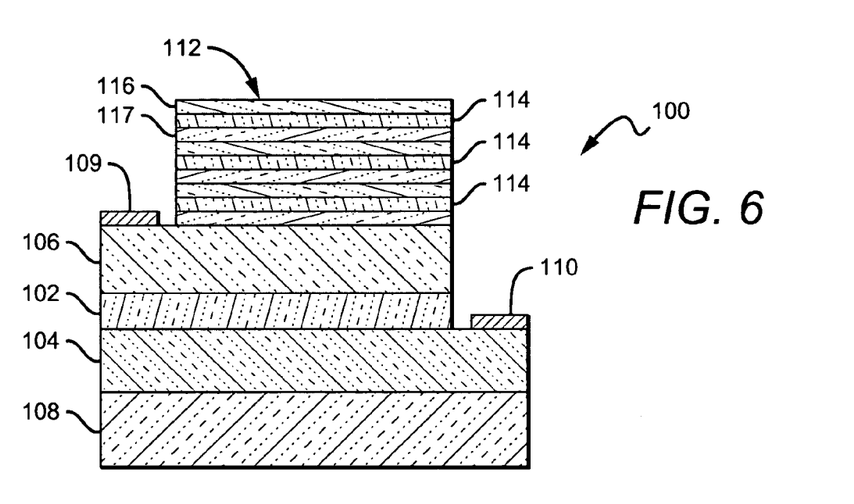
FIG. 6 is a sectional view of one embodiment of an LED according to the present invention having a multiple quantum well structure.

As mentioned above, the quantum well structures utilized according to the present invention have many different forms with different numbers of layers. FIG. 6 shows another embodiment of an LED 100 according to the present invention that is similar to the LED 10 in FIG. 1 and similarly has a lateral geometry. It comprises an active layer 102 sandwiched between an n-type layer 104 and a p-type layer 106, all of which are successively formed on a substrate 108. A p-type contact 109 is formed on the p-type layer 106, and an n-type contact 110 is formed on the n-type layer 104.

The LED 100 further comprises a quantum well structure 112 on the p-type layer 106 that is arranged to absorb light from the active layer 102 and re-emit different wavelengths of light. The structure 112, however, does not comprise a SQW structure, but instead comprises a MQW structure. That is, there are more than one well layer 114, each of which can be sandwiched between respective first and second barrier layers 116, 117. The multiple quantum well structures can be made of many different material systems, with a preferred structure being made of the Group-III material system and having many of the same properties as the SQW structure described above. In one embodiment, the structure can comprise InGaN well layers 114 sandwiched between first and second GaN barrier layers 116, 117. The layers can have different dopants, and in one embodiment, the well layers and first and second barrier layers have n-type dopants. A three MQW structure can comprise layers as follows: GaN/InGaN/GaN/GaN/InGaN/GaN/GaN/InGaN/GaN. In other embodiments, the MQW structure can comprise a single barrier layer between well layers such that the three MQW structure comprises layers as follows: GaN/InGaN/GaN/InGaN/GaN/InGaN/GaN. The thicknesses and composition of the well layers dictates the colors emitted by the well layers 112. In the embodiment shown, the MQW structure 112 absorbs light emitted from the LED's active layer 102 and each of the well layers 114 re-emit the same color of light. Each of the quantum wells can also be arranged to have different compositions and/or thicknesses such that each absorbs the active region light and re-emit a different color of light.

It is understood that in many embodiments many more well layers and associated barrier layers can be used in MQW structures according to the present invention. In some embodiment the MQW structure can comprise 100 or more well layers with associated barrier layers.

Figure 7:
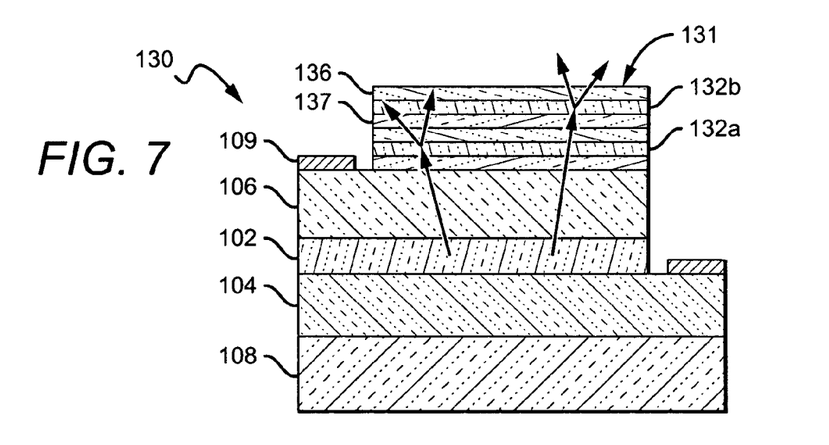
FIG. 7 is a sectional view of another embodiment of an LED according to the present invention having a multiple quantum well structure.

FIG. 7 shows another embodiment of an LED 130 according to the present invention that is similar to the LED 100 in FIG. 6, and for similar features in this embodiment (and embodiments below) the same reference numerals are used. The LED 130 comprises an active layer 102, n-type layer 104, p-type layer 106, substrate 108, p-type contact 100 and n-type contact 110. The LED 130 further comprises a MQW structure 131 on the p-type layer 106 having first and second well layers 132a, 132b each of which is sandwiched between a two barrier layers 136, 137. In this embodiment, each of the well layers 132a, 132b can have different thicknesses and compositions such that each of the layers re-emits a different color of light. Like the MQW structure embodiment described above, there can be many more well layers with associated barrier layers. These well layers can have divided into two groups, one with a first thickness and the second with a second thickness, so the first thickness well layers re-emit at one wavelength and the second thickness well layers re-emit at another wavelength.

As discussed above, InGaN well layers can emit different colors of light by having a different percentage of In in each of the well layers 132a, 132b and/or by having a different well layer thickness. In one embodiment, the well layers can have the same percentage of In with the layers having varying thicknesses. These layers can be grown at the same temperature, and by having the same In content grown at the same temperature allows for reproducible quantum well structures that are easier to grow.

The MQW structure absorbs light emitted from the active layers and each of the well layers 132a. 132b emits a different wavelength of light. This light can then combine with the remaining active layer light to provide the LED's emitted light. It is understood that in MQW structures the barrier layers should be thick enough such that the wave functions of in the individual quantum wells do not interact. A suitable thickness for this type of quantum well would have barrier layers greater than approximately 10 nm thick. If the barrier layers are thinner, the discrete energy levels in the well layers can instead form energy bands in a super lattice (SL).

Figure 8:
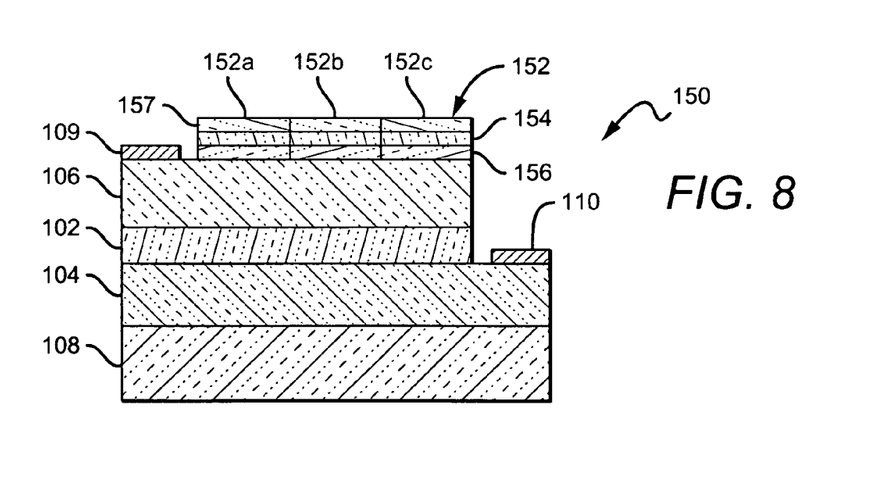
FIG. 8 is a sectional view of one embodiment of an LED according to the present invention having a single quantum well structure divided into different portions.

The quantum well structures can be arranged in many different ways to re-emit different colors of light. FIG. 8 shows another embodiment of an LED 150 according to the present invention that comprises an active layer 102, n-type layer 104, p-type layer 106, substrate 108, p-type contact 109 and n-type contact 110. The LED 150 further comprises a quantum well structure 152 on the p-type layer 106 that has a single well layer 154 sandwiched between first and second barrier layers 156, 157. The structure 152, however, can be divided into different sections that can have similar or different shapes, with each portion absorbing light from the active layer and emitting a different wavelength of light. In the embodiment shown, the QW structure 152 is divided into first, second and third portions 152a, 152b, 152c with the well layer in each having a thickness and composition such that the light from the active layer 102 is absorbed and re-emitted at a different wavelength. The LED 150 can emit a wavelength combination of light from the active layer 102 and different portions of the quantum well structure.

In other embodiments, additional contacts can be included on the LED to stimulate emission from the active region in different locations and at different levels of intensity. This allows for controlled emission from the active region below desired portions of the quantum well structure to control the level of re-emission from the particular portion. For example, if it is desired to increase re-emission from a particular portion, the intensity of the active region emission can be increased below that portion. If decreased re-emission is desired, the intensity below can be reduced.

Figure 9:
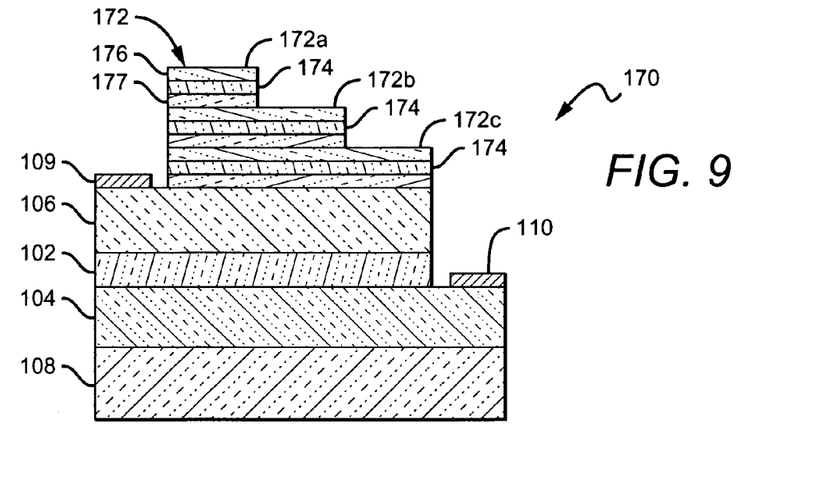
FIG. 9 is a sectional view of another embodiment of an LED according to the present invention having a multiple quantum well structure.

FIG. 9 shows still another embodiment of an LED 170 according to the present invention that comprises an active layer 102, n-type layer 104, p-type layer 106, substrate 108, p-type contact 109 and n-type contact 110. The LED 170 further comprises a quantum well structure 172 having three quantum wells 172a-c, each of which has a well layer 174 sandwiched between first and second barrier layers 176, 177. It is understood that each quantum well layer and barrier layer combination can also comprise its own super lattice or multiple quantum well structure.

Each of the quantum wells 172a-c covers a different area with the quantum wells in a stepped arrangement. Each of the first, second and third quantum wells 172a-c can have different thicknesses and compositions so that each can absorb some of the light emitted by the active layer 102 and converts the light to a different wavelength of light. In this embodiment, the first of the quantum well 172a does not absorb all the active layer light so that some of the light passes into the second quantum well 172b. Similarly, the second quantum well 172b does not absorb all the active region light that passes through it so that some of it passes into the third quantum well 172c. This allows the LED 170 to emit colors from all of the quantum wells 172a-c.

In other embodiments, the second and third quantum wells 172b, 172c can be designed with different compositions and thicknesses to absorb light reemitted from the quantum well in the layer below. For example, second quantum well 172b can be designed to absorb the re-emission from the doping in the first quantum well 172a, and the third quantum well 172c can be designed to absorb the re-emission from the second quantum well 172b. In still other embodiments, each of the quantum wells 172a-c can cover one of the quantum wells below it, or only some cover the layer below it. The LED 170 can be fabricated using different methods, and one suitable method comprises in-situ deposition of the quantum wells 172a-c and etching as needed.

Figures 10, 11, 12:
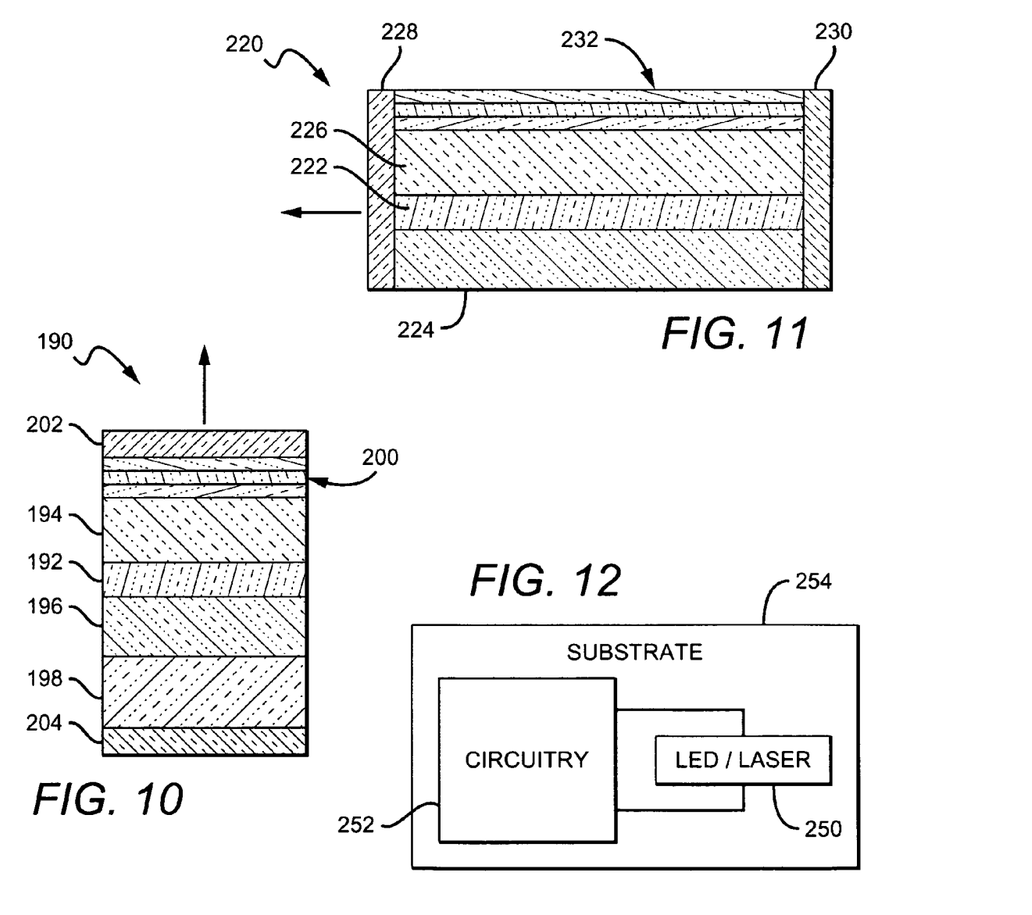
FIG. 10 is a sectional view of one embodiment of a solid state laser according to the present invention having a quantum well structure.
FIG. 11 is a sectional view of another embodiment of a solid state laser according to the present invention grown having a quantum well structure.
FIG. 12 is a block diagram of the new LED/laser, connected to electrical circuitry.

The present invention can also be used with solid state laser such as vertical cavity lasers and edge emitting lasers. FIG. 10 shows one embodiment of a nitride based vertical cavity laser 190 according to the present invention which is structurally similar to a LED. It has an active layer 192 sandwiched between a p-type layer 194 and an n-type GaN layer 196, all of which can be grown on a substrate 198. These layers can be made from many different material systems, with a preferred system being the Group-III nitride material system. The active layer 192 can be InGaN and the n- and p-type layers 194, 196 being GaN. The laser 190 further comprises a quantum well structure 200 that can comprise one or more well layers sandwiched between barrier layers as described above. The quantum well structure 200 absorbs light from the active layer and re-emits a different color of light. First and second mirrors 202, 204 are on the top and bottom to reflect light between the two, with light partially escaping through mirror 202 resulting in a highly collimated/coherent light source.

When a bias is applied to the p and n-type layers 194, 196 through electrical contacts (not shown), the active layer 192 emits light and some of the light passes into the quantum well structure 200. Some or all of the light is absorbed and re-emits as different wavelength of light. The light reflects between the mirrors 202, 204 to produce stimulated LED emission of the active layer light and re-emitted light from the quantum well structure 200. Depending on the thickness and composition of the well layers in the quantum well structure the color of the re-emitted light can be different, as described above, and as a result the color of laser light can be different. In most embodiments, the mirrors 202, 204 favor one or more colors (or wavelengths) for achieving stimulated emission.

The quantum well structure can be located in many different locations in lasers according to the present invention. In one embodiment the quantum well structure can be located outside the laser cavity, such as on the mirror through which the collimated/coherent light escapes. The collimated/coherent light source escaping through the mirror passes into the quantum well structure and can be re-emitted from the quantum well structure at a different wavelength of light. The light typically emits from the quantum well structure randomly or omnidirectionally.

FIG. 11 shows one embodiment of a edge emitting laser 220 according to the present invention that works much the same as a vertical cavity laser and also has an active layer 222 sandwiched between n- and p-type layers 224, 226. First and second mirrors 228, 230 are included on opposing sides of the laser 220 with the collimated light generally emitting through the first mirror 228. The waveguiding effect of the active, n-type and p-type layers 222, 224, 226 should also be considered. It is generally understood that n- and p-type layers can function as a waveguide between the mirrors 228, 230. A preferable arrangement is for the higher index of refraction material to be arranged in the middle portion of the laser with the higher index of refraction material on the outer portion to form an efficient waveguide. Lower bandgap material typically has a index of refraction.

In operation, the light from the active layer 222 emits omnidirectionally at first with some of it reflecting between the first and second mirrors 228, 230 to reach stimulated emission. The laser further comprises a quantum well structure 232 and some of the light from the active layer 222 also enters the structure 232 where it is absorbed and re-emits at a different wavelength depending on the composition and thickness of the layers in the structure 232. The light re-emitted from the structure 232 also reflects between the mirrors 228, 230 and emits with the active layer light from the top surface stimulated emission as a collimated light. It is understood that in this embodiment the p-type layer should be thin enough so that a potion of the light bouncing between mirrors 228,230 is absorbed in quantum well structure 232. Re-emission can be spontaneous or stimulated depending on design.

FIG. 12 shows a LED/laser 250 that can comprise one or more of the LED/laser embodiments described above or their variations. The LED/laser 250 is connected to electrical circuitry 252 that can perform varius functions such as power conversion or conditioning. The circuitry can also control the biases applied to the contacts on the LED/laser 250 described above, to control the emitted colors. In one embodiment, the electrical circuitry can be on a common substrate 254 with the LED/laser 250.

Although the present invention has been described in considerable detail with reference to certain preferred configurations thereof, other versions are possible. Therefore, the spirit and scope of the appended claims should not be limited to their preferred versions contained therein.

I claim:

1. A solid state light emitting device, comprising:
    an emitter structure comprising:
        an active region of semiconductor material;
        a pair of oppositely doped layers of semiconductor material on opposite sides of said active region; and
        a first quantum well structure adjacent to and covering less than all of a top surface of one of said pair of oppositely doped layers of semiconductor material, said first quantum well structure comprising a first well layer interposed between two barrier layers, said first well layer comprising an overall thickness and a bandgap smaller than the bandgap of said active region; and
        a second quantum well structure adjacent to and covering less than all of a top surface of said first quantum well structure, said second quantum well structure comprising a second well layer interposed between two barrier layers, said second well layer comprising a bandgap smaller than the bandgap of said active region and comprising an overall thickness different than that of said first well layer.

2. The emitting device of claim 1, further comprising contacts to each of said oppositely doped layers to apply a bias across said doped layers.

3. The emitting device of claim 1, wherein said emitter structure comprises a light emitting diode (LED).

4. The emitting device of claim 1, wherein said second quantum well structure is on an outer surface of said emitter structure.

5. The emitting device of claim 1, wherein said quantum well structures comprise materials from the Group-III nitride material system.

6. The emitting device of claim 1, wherein said quantum well structures comprise materials from the GaN/InGaN material system.

7. The emitting device of claim 1, wherein said device comprises a light emitting diode (LED), said active region configured to emit blue light and said quantum well structures configured to absorb at least some of said blue light and re-emit at least one different color of light.

8. The emitting device of claim 7, wherein said device comprises a solid state laser, further comprising mirrors on opposing surfaces, said solid state laser and said mirrors configured such that said light from said active region and said light absorbed and re-emitted by said quantum well layers is reflected between said mirrors to achieve stimulated emission.

9. The emitting device of claim 8, wherein said mirrors are configured to favor one or more colors for achieving stimulated emission.

10. The emitting device of claim 1, further comprising electrical circuitry integrated with said device on a common substrate.

11. A method for generating light from a solid state light emitting device, comprising:
    exciting a first optical emission from an active region of semiconductor material arranged between oppositely doped layers, said first optical emission within a first wavelength range;
    illuminating a first quantum well structure comprising a first well layer interposed between corresponding barrier layers all having a bandgap smaller than the bandgap of said active region, said single well layer and at least one of its corresponding barrier layers absorbing light from said first optical emission, said first well layer providing a second optical emission within a second wavelength range different from said first wavelength range in a direction away from said active region;
    illuminating a second quantum well structure comprising a second well layer interposed between corresponding barrier layers all having a bandgap smaller than the bandgap of said active region, said second well layer and at least one of its corresponding barrier layers absorbing light from said first optical emission, said second well layer providing a third optical emission within a third wavelength range different from said first and second wavelength ranges in a direction away from said active region; and transmitting a wavelength combination of said first, second, and third wavelength ranges;

wherein said first quantum well structure and said second quantum well structure are laterally adjacent to and in contact with one another on one of said oppositely doped layers.

12. The method of claim 11, wherein said exciting of an optical emission from an active region comprises applying a bias across said oppositely doped layer.

13. A method for fabricating a light emitting diode (LED), comprising:

fabricating an active epitaxial region between two oppositely doped epitaxial layers using a growth process at a first temperature;

cooling said active epitaxial region and oppositely doped epitaxial layers; and fabricating a first quantum well structure adjacent to and covering less than all of a top surface of one of said two oppositely doped epitaxial layers at a second temperature lower than said first temperature, said first quantum well structure comprising a first well layer comprising a thickness and a composition; and fabricating a second quantum well structure adjacent to and covering less than all of a top surface of said first quantum well structure, said second quantum well structure comprising a second well layer comprising a different thickness and/or composition than said first well layer.

14. The method of claim 13 wherein said growth process comprises metal organic chemical vapor deposition.

15. The method of claim 13, further comprising:

maintaining subsequent processing steps at a temperature below which said quantum well structure would otherwise be thermally damaged.

16. A solid state light emitting device, comprising:

an emitter structure comprising:
an active region of semiconductor material;
a pair of oppositely doped layers of semiconductor material on opposite sides of said active region; and
a quantum well structure adjacent to one of said pair of oppositely doped layers of semiconductor material and comprising a plurality of well layers each sandwiched between two barrier layers, at least some of said well and barrier layers having a bandgap smaller than the bandgap of said active region, said plurality of well layers in a physical stair-step arrangement, wherein the thickness of each successive well layer in said physical stair-step arrangement is different from each prior well layer in said physical stair-step arrangement.

17. A method for generating light from a solid state light emitting device, comprising:

exciting an optical emission from an active region arranged between oppositely doped layers within a first wavelength range;

illuminating a quantum well structure comprising a plurality of physically stair-stepped well layers between a respective plurality of first and second barrier layers, said well layers and barrier layers in a stack such that each successive well layer is over less than all of the top surface of the previous well layer and has a different overall thickness than each of said previous well layers, said quantum well structure providing re-emission of said first wavelength range within at least second and third wavelength ranges; and transmitting light that is a combination of said first, second, and third wavelength ranges.

18. The emitting device of claim 1, wherein said each of said first and second quantum well structures comprises multiple well layers.

19. The emitting device of claim 1, wherein at least one of said first and second barrier layers is compositionally graded.

20. The emitting device of claim 1, wherein said pair of oppositely doped layers of semiconductor material, said active region, and said first and second quantum well structures are successively epitaxially grown.

21. The emitting device of claim 1, wherein each of said first and second quantum well structures is configured to emit light with a wavelength determined by the composition of said structure.

22. The emitting device of claim 1, wherein at least one of said quantum well layers comprises In that is unevenly distributed.

23. The method of claim 11, wherein at least one of said first and second quantum well structures comprises In that is unevenly distributed.

24. The method of claim 13, wherein at least one of said first and second quantum well structures comprises In that is unevenly distributed.

25. The emitting device of claim 16, wherein said quantum well structure comprises In that is unevenly distributed.

26. The emitting device of claim 16, wherein each of said plurality of well layers in the stair-step arrangement covers a different area.

27. The method of claim 17, wherein said quantum well structure comprises In that is unevenly distributed.

28. The method of claim 17, wherein each of said plurality of stair-stepped well layers covers a different area.

* * * * *